US008307298B2

(12) United States Patent
Kai

(10) Patent No.: US 8,307,298 B2
(45) Date of Patent: Nov. 6, 2012

(54) COMPUTER READABLE STORAGE MEDIUM AND DATA PROCESSOR FOR OUTPUTTING A USER INTERFACE CAPABLE OF READING ALOUD THE PROGRESS OF A PROCESS

(75) Inventor: Takafumi Kai, Nagoya (JP)

(73) Assignee: Brother Kogyo Kabushiki Kaisha, Aichi-ken (JP)

(*) Notice: Subject to any disclaimer, the term of this patent is extended or adjusted under 35 U.S.C. 154(b) by 440 days.

(21) Appl. No.: 12/408,242

(22) Filed: Mar. 20, 2009

(65) Prior Publication Data

US 2009/0238347 A1 Sep. 24, 2009

(30) Foreign Application Priority Data

Mar. 21, 2008 (JP) ................................. 2008-074054

(51) Int. Cl.
*G06F 3/048* (2006.01)
(52) U.S. Cl. ........................................ 715/772; 715/778
(58) Field of Classification Search .................. 715/728, 715/778, 772
See application file for complete search history.

(56) References Cited

U.S. PATENT DOCUMENTS

| | | | |
|---|---|---|---|
| 6,208,334 B1 | 3/2001 | Ueda | |
| 6,452,609 B1* | 9/2002 | Katinsky et al. | 715/716 |
| 2003/0048469 A1* | 3/2003 | Hanson | 358/1.14 |
| 2004/0088165 A1* | 5/2004 | Okutani et al. | 704/260 |
| 2005/0071165 A1* | 3/2005 | Hofstader et al. | 704/270.1 |
| 2006/0059420 A1* | 3/2006 | Boguraev et al. | 715/513 |
| 2006/0116883 A1 | 6/2006 | Kawamura | |
| 2007/0115501 A1* | 5/2007 | Bridges et al. | 358/1.15 |
| 2008/0114599 A1* | 5/2008 | Slotznick et al. | 704/260 |
| 2008/0282150 A1* | 11/2008 | Erwin et al. | 715/255 |
| 2010/0031142 A1* | 2/2010 | Nagatomo | 715/254 |

FOREIGN PATENT DOCUMENTS

| | | |
|---|---|---|
| JP | 4-140689 | 5/1992 |
| JP | 9-282137 | 10/1997 |
| JP | 10-104010 | 4/1998 |
| JP | 2000-32200 | 1/2000 |
| JP | 2002-288071 | 10/2002 |
| JP | 2006-155267 | 6/2006 |
| JP | 2008-116253 | 5/2008 |
| JP | 2009-42159 | 2/2009 |

* cited by examiner

*Primary Examiner* — Doon Chow
*Assistant Examiner* — Le Nguyen
(74) *Attorney, Agent, or Firm* — Scully, Scott Murphy & Presser, PC

(57) ABSTRACT

A computer program for outputting a user interface to a computer. The computer outputs a voice message and the user interface consecutively informs a progress of a process executed by the computer. The program determines whether or not the user interface consecutively informs the progress of another process with a voice message. A first user interface consecutively informs the progress of the specific process with a first voice message that includes start, ongoing, and end messages, if the first determining step determines that the user interface does not consecutively inform the progress of the another process with the voice message. A second user interface informs the progress of the specific process with a second voice message that includes start and end messages while omitting the ongoing message, if the first determining step determines that the user interface consecutively informs the progress of the another process with the voice message.

10 Claims, 4 Drawing Sheets

COMPUTER READABLE STORAGE MEDIUM AND DATA PROCESSOR FOR OUTPUTTING A USER INTERFACE CAPABLE OF READING ALOUD THE PROGRESS OF A PROCESS

CROSS REFERENCE TO RELATED APPLICATIONS

This application claims priority from Japanese Patent Application No. 2008-074054 filed Mar. 21, 2008. The entire content of the priority application is incorporated herein by reference.

TECHNICAL FIELD

The present invention relates to a computer readable storage medium and a data processor for outputting a user interface capable of reading aloud a progress of a process.

BACKGROUND

In recent years, a data processor such as a personal computer (hereinafter, referred to as a "PC") generally allows a user to use a GUI (Graphic user Interface) included in the OS (Operating System) for operation. However, such a PC is inconvenient for a visually-impaired user. In order to help the visually-impaired user to use the PC, a program called "screen reader" for reading aloud the GUI message displayed on a display unit of the PC has been developed for commercial use.

On the other hand, data processor that can display GUIs including a progress bar for continuously displaying the progress of a process is known. Such data processor allows a user to visually recognize the progress of the process currently being executed on data processor with respect to a scanning process and a printing process by an image reader or a printer those connected to the data processor (for example, see Japanese patent application publication No. 2000-32200). This publication also discloses a technology for displaying a plurality of progress bars to indicate the progresses of a plurality of processes being currently executed at the same time.

In order to read aloud the GUI such as the progress bar for continuously indicating the progress of the process being executed on a data processing, the screen reader responds to the degree of progression varying every moment on the progress bar one by one. For example, if the GUI indicates the progress on a percentage basis, the screen reader continuously reads aloud the progress, for example " . . . 10%, 11%, 12% . . . "

SUMMARY

However, while the screen reader is continuously reading aloud the indication of one progress bar displayed for the process being executed by one program, if another progress bar indicating a process newly started by another program is also displayed, the screen reader reads aloud these progress bar indications at the same time. In this case, a user who is operating the PC relying only voice information may feel odd.

Further, the GUI such as the progress bar is displayed, not only for the process executed by the user's instruction inputted through an operational device such as a mouse or a keyboard, but also for the process executed automatically regardless of the user's intention, for example an automatic update of a program. If the screen reader reads aloud the GUI message indicating the progress of the process executed automatically without any user's instruction, the user may feel confused to hear the progress message of the latter process.

In view of the foregoing, it is an object of the present invention to provide a data processing program and a data processor for outputting a user interface (hereinafter, refer to as a "UI"), in such a way that the user feels neither odd nor confused when the data processor reads aloud the user interface indicating the progress of the process currently being executed.

In order to attain the above object, the invention provides a computer readable storage medium storing a computer-executable program for outputting a user interface to a computer. The computer includes a voice message output device for outputting a voice message. The user interface is capable of consecutively informing a progress of a process executed by the computer and the progress is informed with the voice message through the voice message output device. The program causes the computer to execute the steps including first determining whether or not the user interface consecutively informs an another progress of another process with a voice message at the computer upon start timing of informing a one progress of a specific process to be executed, first outputting to the computer a first user interface capable of consecutively informing the one progress of the specific process with a first voice message that includes a start message indicating a start of the specific process, an ongoing message indicating an ongoing of the specific process, and an end message indicating an end of the specific process, if the first determining step determines that the user interface does not consecutively inform the another progress of the another process with the voice message, and second outputting to the computer a second user interface capable of informing the one progress of the specific process with a second voice message that includes a start message and an end message while omitting the ongoing message, if the first determining step determines that the user interface consecutively informs the another progress of the another process with the voice message.

According to another aspect, the present invention provides a computer readable storage medium storing a computer-executable program for outputting a user interface to a computer. The computer includes a voice message and an operation device. The output device is for outputting a voice message. The operation device is for inputting instruction to start indication of a progress of a process. The user interface is capable of consecutively informing the progress of the process executed by the computer and the progress is informed with the voice message through the voice message output device. The program causes the computer to execute the steps including second determining whether or not the indication of a progress of a specific process has already been started by the instruction inputted through the operation device, first outputting to the computer a first user interface capable of consecutively informing the progress of the specific process with a first voice message that includes a start message indicating a start of the specific process, an ongoing message indicating an ongoing of the specific process, and an end message indicating an end of the specific process, if the second determining step determines that the indication of the progress of the specific process has already been started by the instruction inputted through the operation device, and second outputting to the computer a second user interface capable of informing the progress of the specific process with a second voice message that includes a start message and an end message while omitting the ongoing message, if the second determining step determines that the indication of the progress of the specific process having been started is not caused by the instruction inputted through the operational device.

According to still another aspect, the present invention provides a data processor for outputting a user interface capable of informing a progress of a process with a voice message. The data processor includes a first determining unit, a first outputting unit, and a second outputting unit. The first determining unit determines whether or not the user interface consecutively informs an another progress of another process with the voice message upon start timing of informing a one progress of a specific process to be executed. The first outputting unit outputs a first user interface capable of consecutively informing the one progress of the specific process with a first voice message that includes a start message indicating a start of the specific process, an ongoing message indicating an ongoing of the specific process, and an end message indicating an end of the specific process, if the first determining unit determines that the user interface does not consecutively inform the another progress of the another process with the voice message. The second outputting unit outputs a second user interface capable of informing the one progress of the specific process with the a second voice message that includes a start message and an end message while omitting the ongoing message, if the first determining unit determines that the user interface consecutively informs the another progress of the another process with the voice message.

According to still another aspect, the present invention provides a data processor for outputting a user interface capable of informing a progress of a process with a voice message. The data processor includes an operation device, a second determining unit, a first outputting unit, and a second outputting unit. The operation device inputs an instruction to start indication of the progress of the process. The second determining unit determines whether or not the indication of a progress of a specific process has already been started by the instruction inputted through the operation device. The first outputting unit outputs a first user interface capable of consecutively informing the progress of the specific process with the a first voice message that includes a start message indicating a start of the specific process, an ongoing message indicating an ongoing of the specific process, and an end message indicating an end of the specific process, if the second determining unit determines that the indication of the progress of the specific process has already been started by the instruction inputted through the operation device. The second outputting unit outputs a second user interface capable of informing the progress of the specific process with a second voice message that includes a start message and an end message while omitting the ongoing message, if the second determining unit determines that the indication of the progress of the specific process having been started is not caused by the instruction inputted through the operational device.

DETAILED DESCRIPTION

Next, an embodiment of the present invention will be described while referring to the accompanying drawings.

A data processor and a data processing program installed therein according to one embodiment of the present invention will be described with reference to FIGS. 1 through 3(C).

A Personal computer 1 (hereinafter referred to as a "PC 1") is a typical example of the data processor. Through an application program running on the PC 1, the PC 1 and a multi-function device 2 can execute various processes in cooperation, including a printing process and an image-scanning process.

Figure 1:
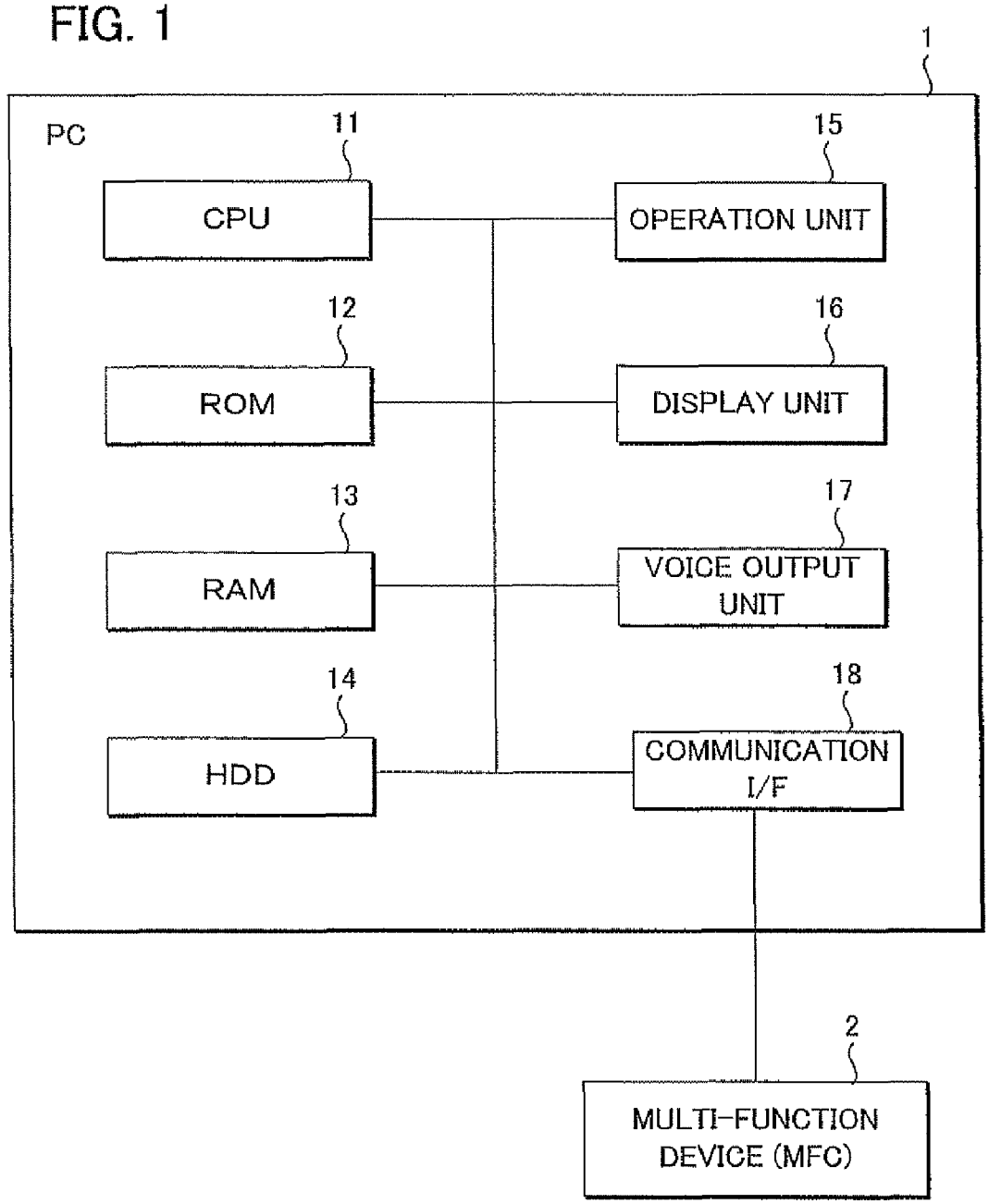
FIG. 1 is a schematic diagram showing a system construction of a PC and a multi-function device connected to the PC.

Referring to FIG. 1, in this cooperative system, the PC 1 includes a CPU 11, a ROM 12, a RAM 13, a hard disk drive 14 (hereinafter, referred to as a "HDD 14"), an operation unit 15, a display unit 16, a voice output unit 17, and a communication interface 18 (hereinafter referred to as a "communication I/F 18").

The CPU 11 controls each unit of the PC 1, and performs various operations based on programs stored in the ROM 12 and the RAM 13. The CPU 11 also executes a GUI output process described later.

The ROM 12 is a nonvolatile storage device that stores a non-erasable data even when the PC 1 is powered off. The ROM 12 stores a BIOS (Basic Input/Output System) and read only data which is not updated in ordinary cases.

The RAM 13 is a storage device employed as a main memory accessed directly by the CPU 11. The OS and various application programs retrieved from the HDD 14 is stored in the RAM 13. The data of the result of the various calculation executed by the CPU 11 and data retrieved from the HDD 14 is also stored in the RAM 13. In order to execute various processes including the GUI output process described later, the program for executing each process in the CPU 11 is loaded from the HDD 14 to the RAM 13. The CPU 11 then executes each process according to the program stored in the RAM 13.

The HDD 14 is an auxiliary storage device that stores the OS, various programs, and various data files.

The operation unit 15 is an input device for entering various instructions given by a user. The operation unit 15 includes a operational device, for example, a keyboard and a pointing device (a mouse.)

The display unit 16 is an output device for presenting various types of information to the user. The display unit 16 includes a liquid crystal display capable of displaying a color image.

The voice output unit 17 is an output device for outputting various types of information by voice. The voice output unit 17 includes a speaker.

The communication I/F 18 are an interface connectable to a printer, a multi-function apparatus, and other peripheral devices. A USB (Universal Serial Bus)-compliant serial interface is a typical example of the communication I/F.

The OS installed in the PC 1 according to the embodiment has a multitasking feature. Through this feature, plural processes by plural programs can be executed in parallel, and perform various processes cooperatively. The OS also has a multi-window feature. An application program functions to display a window as the GUI on the display unit 16 under the control of the OS.

Onto the PC 1 according to the embodiment, a screen reader is installed as an application for helping a visually-impaired user to be capable of using the PC 1.

The screen reader converts a character data, which is included in the GUI displayed on the display unit 16 by another application program, into an audio data. The screen reader outputs the audio data to the voice output unit 17, so that the usually impaired user can know the character data displayed on the GUI by voice. While the display unit 16 is displaying the GUI indicating the progress of the process currently executed by another application program (see FIG. 3(B)), the screen reader reads aloud the progress, for example "... 30%, 31%, 32% ...." This allows the user to know the progress of the process currently executed on the PC 1, through hearing.

The multi-function device 2 has a printing function for printing an image or a document based on the print data transmitted from the PC 1, image-scanning function for scanning an image recorded on an original and converting the scanned information into electronic form and then transmitting the converted information to the PC 1, a copy function, and a facsimile function.

An application program executing a "GUI output process" is the typical example of data processing program. While the PC 1 and the multi-function device 2 are cooperatively executing a process such as a printing process and an image-scanning process, the display unit 16 displays the GUI progress bar indicating the progress and the scanning progress in the GUI output process. The GUI displayed through the GUI output process includes the character data that can be read aloud by the screen reader. If the setting has been made in the OS such that the screen reader is ready to read aloud the indication displayed on the GUI, the screen reader reads aloud the character data displayed by the GUI.

The GUI output process executed by the CPU 11 of the PC 1 will be described with reference to FIGS. 2 and 3.

Figure 2:
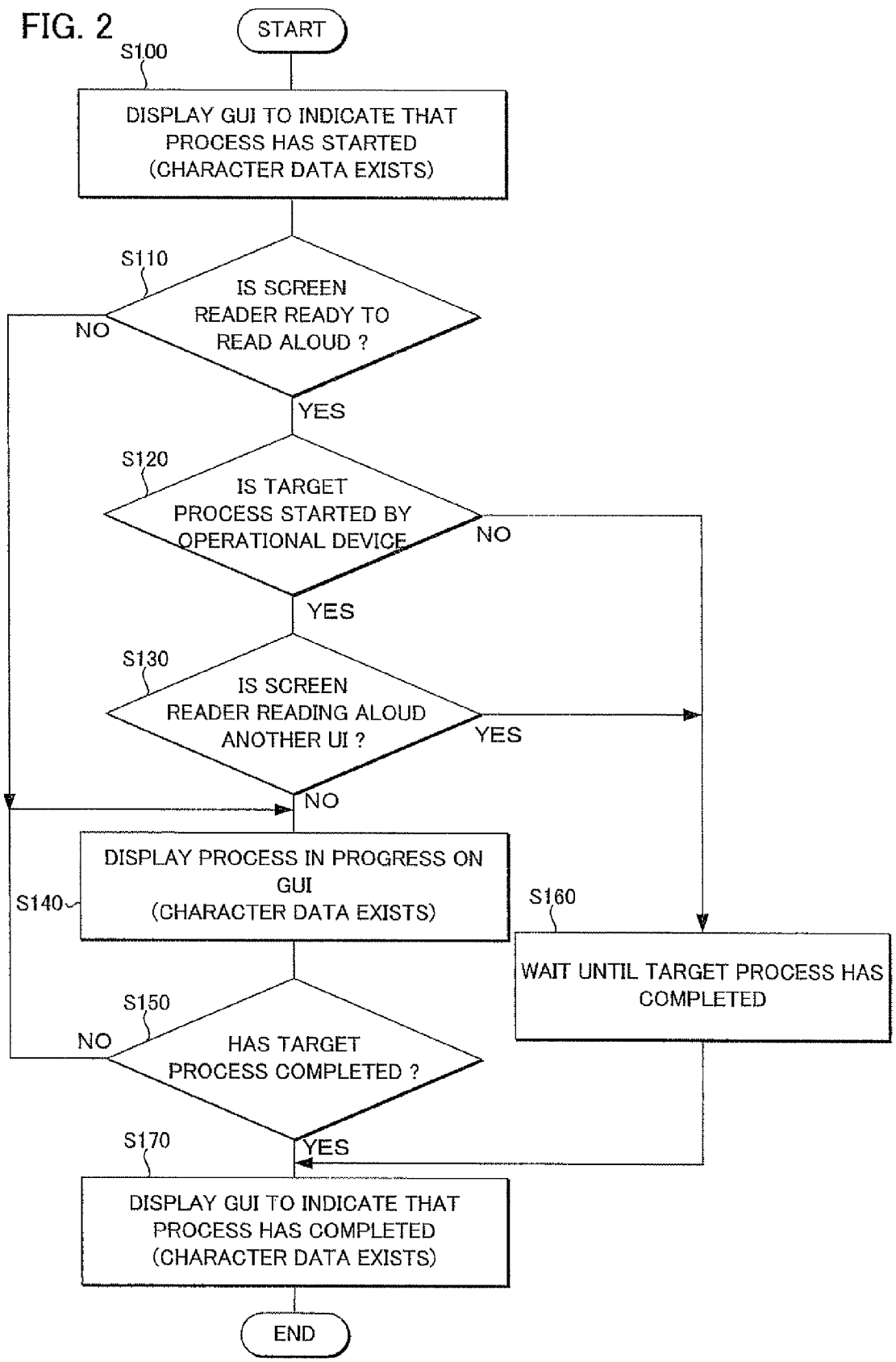
FIG. 2 is a flowchart showing a procedure of a GUI output process according to an embodiment of the present invention.
Figure 3:
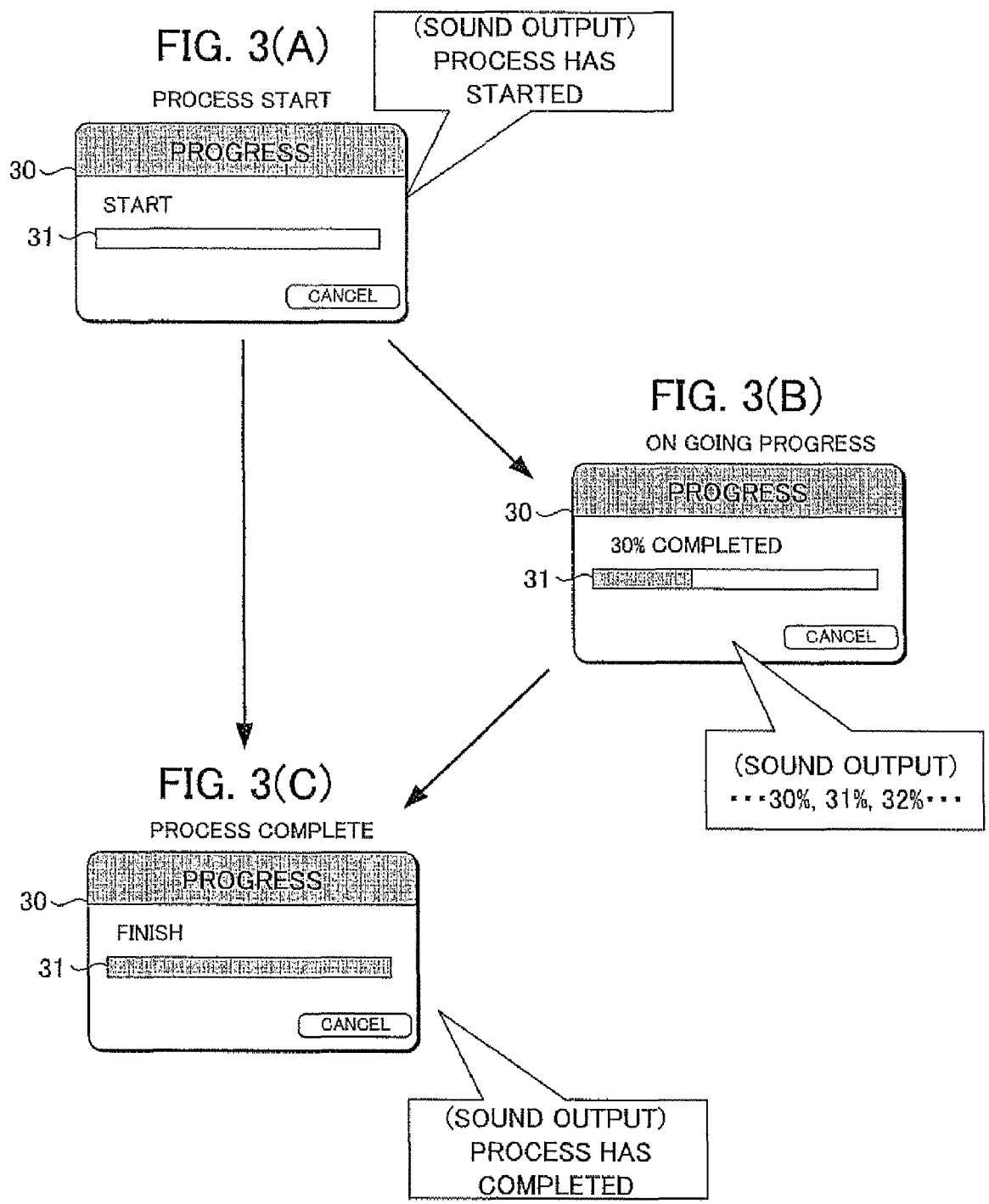
FIG. 3(A) is an explanatory diagram showing the GUI displayed on a display unit when a target process has just started.
FIG. 3(B) is an explanatory diagram showing the GUI indicating the progress of the target process.
FIG. 3(C) is an explanatory diagram showing the GUI when the target process has just finished.

FIG. 2 is a flowchart showing a procedure of the GUI output process. The GUI output process starts in conjunction with the start of a process (e.g., a printing process or an image-scanning process, hereinafter referred to as a "target process") whose progress is to be displayed in the GUI output process.

In S100, as the CPU 11 starts a GUI output process, the CPU 11 displays a progress window on the display unit 16 as shown in FIG. 3(A). The progress window in FIG. 3(A) represents the GUI for indicating that the target process has just started. The progress window 30 includes a progress bar 31 having a bar graph to indicate the progress of the target process on a percentage basis. The progress window 30 also indicates the current progress status in characters.

In S100, as shown in FIG. 3(A), the CPU 11 displays the unfilled progress bar 31, which means that the target process has progressed by 0%. The CPU 11 also displays the character information "start" to indicate that the target process has just started. The data of the progress window 30 includes character data used for reading aloud the indicated message by the screen reader. If the setting has been made in the OS such that screen reader is ready to read aloud the displayed indication, the screen reader reads aloud the character data included in the GUI. When the CPU 11 displays the progress window 30 to indicate that the target process has just started in S100, the output unit 17 outputs a voice message saying "the process has started". On the other hand, if no setting has been made such that the screen reader is ready to read aloud the indication, only the progress window 30 is displayed, and no voice message is output.

Referring back to the flowchart of FIG. 2, after the CPU 11 displays the GUI to indicate that the target process has just started in S100, the CPU 11 determines whether or not the setting has been made in the OS such that the screen reader is ready to read aloud the character data in S110. In this step, the CPU 11 checks the current setting status in the OS, and then determines whether or not the screen reader is ready to read aloud the character data.

If the CPU 11 determines that the screen reader is ready to read aloud the character data (S110: YES), the CPU 11 determines whether or not the target process has been started by an instruction inputted from the operational device (specifically, manually) in S120. In this step, the CPU 11 determines whether or not the target process has been manually started, for example, by checking a log of the event in the application program. The log has triggered the start of the target process.

Examples of processes to be manually started in the PC 1 include a process in which printing or image scanning (so-called "pull scanning") is performed in the multi-function device 2 in response to an instruction provided by the user from the PC 1.

On the other hand, examples of processes to be automatically started include a push-scanning process in which image scanning is started in the multi-function device 2 so that the image data is transmitted to the PC 1 without any operation in the PC 1, and a process in which an application program installed in the PC 1 is automatically updated according to a preset schedule.

If the CPU 11 determines that the target process has been started by the instruction inputted via the operational device (S120: YES), the CPU 11 then determines whether or not the screen reader is reading aloud the GUI indicating the progress of the process which is currently executed by another application program in S130. Generally, the OS understands the GUI display status outputted from an application program, and the operational status of another application program such as the screen reader.

Therefore, by inquiring the OS about the currently displayed GUI and about activation of the screen reader, the CPU 11 determines whether or not the screen reader is reading aloud the GUI indicating progress of the process.

If the CPU 11 determines that the screen reader is not reading aloud the GUI progress indicative of the process which is currently executed by another application program (S130: NO), the CPU 11 displays the progress of the target process on the GUI in S140. Specifically, succeeding from the status in which the progress window 30 indicates that the process has just started as shown in FIG. 3(A), the progress bar 31 extends the length thereof in accordance with the process progression as shown in FIG. 3(B). The progress window 30 also displays character information to indicate the progress of the target process on a percentage basis (for example, "30% completed"). Further, based on the character data included in the data of the progress window 30, the screen reader reads aloud the progress. For example, if the progress window 30 indicates that the target process has progressed by 30%, the voice message saying "30%" is outputted from the voice output unit 17.

Referring back to FIG. 2, the CPU 11 determines whether or not the target process has completed in S150. If the CPU 11 determines that the target process has not completed yet (S150: NO), the routine returns to S140 where the CPU 11 continuously displays the progress of the target process on the GUI. While steps of S140 and S150 are repeatedly executed in the GUI output process, the screen reader continuously outputs voice messages saying " . . . 30%, 31%, 32% . . . " by reading aloud the message on the progress window 30.

If the CPU 11 determines that the target process has completed (S150.YES), the CPU 11 displays the character data on the GUI displayed on the display unit 16 to indicate that the target process has completed in S170. Specifically, succeeding from the status of the progress window 30 shown in FIG. 3(B), the CPU 11 displays the progress window 30 in the status shown in FIG. 3(C). In the progress window 30 of the status shown in FIG. 3(C), the progress bar 31 has extended the entire length thereof. The CPU 11 also displays the character data "finish" on the progress window 30 to indicate that the process has completed. Based on the character data included in the data of the progress window 30, the CPU 11 outputs the voice message saying "the process has completed" from the voice output unit 17.

On the other hand, if the CPU 11 determines that the target process has started not by an instruction inputted through the operational device (S120: NO), or if the CPU 11 determines that the screen reader is reading aloud the GUI progress indication of the process which is currently executed by another application program (S130: YES), the CPU 11 waits until the target process has finished without displaying the target process progress on the GUI in S160. In this step, the CPU 11 may keep displaying the GUI displayed in S100 for indicating that the process has started until the target process has finished. Alternatively, the CPU 11 may erase the GUI after the expiration of a predetermined period of time. As the target process finishes after that, the CPU 11 displays the GUI for indicating that the target process has finished, on the display unit 16 (see FIG. 3(C)) in S170. In this step, based on the character data included in the data of the progress window 30, the CPU 11 outputs the voice message saying "the process has completed" from the voice output unit 17.

On the other hand, if the CPU 11 determines that the screen reader is not ready to read aloud the message on the GUI (S110: NO), the GUI output process proceeds to S140. The CPU 11 then executes the steps of S140 to S170 in order as mentioned above. In these steps, the screen reader does not read aloud the message indicated on the progress window 30.

The system according to the embodiment has the following effects. While the screen reader is reading aloud the progress indicative of another process on the PC 1, the system can let the user know by the GUI and by voice, only start and end timing of the target process without letting the user know by voice the on going process of the target process. Therefore, the system does not read aloud the progresses of plural processes which are being executed in parallel, thereby preventing the user from feeling odd and confused.

If the target process has been started not by an instruction inputted by the user through the operational device, the system can let the user know by the GUI and by voice, only start and end timings of the target process without letting the user know by voice on going progress of the target process. Therefore, the system does not read aloud the progress of the process which has been started not by the user, thereby preventing the user from feeling odd and confused.

Figure 4:
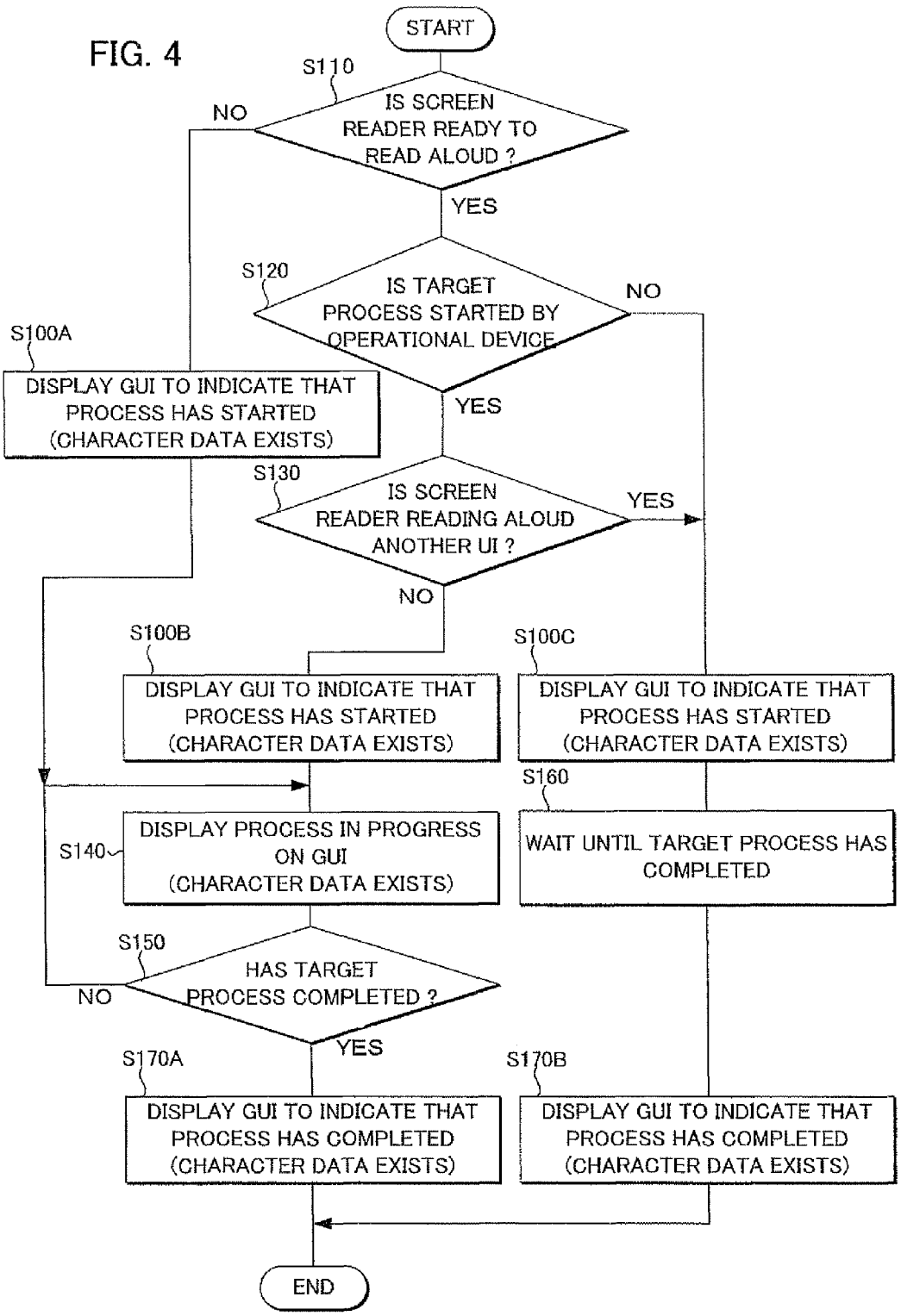
FIG. 4 is a flowchart showing a procedure of the GUI output process according to a modification to the embodiment.

FIG. 4 shows a modification to the above-described embodiment, in which like parts and components are designated by the same reference numerals as those of the above-described embodiment to avoid duplicating description.

In the modification, the CPU firstly determines whether or not the screen reader is ready to read aloud in S110. If the CPU determines that the screen reader is not ready to read aloud (S110: NO), the CPU displays the GUI to indicate that process has started without voice message in S100A. Then the routine goes to S140. If the determination falls affirmative (S110: YES), the routine goes to S120.

If the target process has been started by an instruction inputted through the operational device (S120: YES), and If the CPU determines that the screen reader is not reading aloud the GUI progress indication of the process which is currently executed by the another application (S130: NO), the CPU displays the GUI to indicate that the target process has started in S100B.

If the target process has been started not by an instruction inputted through the operational device (S120: NO), or If the CPU determines that the screen reader is reading aloud the GUI progress indication of the process which is currently executed by the another application (S130: YES), the GUI output process proceeds to S100C. In S100C, the content and/or tone can be the same as or different from that of S100B.

If the CPU determines the target process has completed in S150 (S150: YES), the CPU displays the GUI that the target process has finished in S170A.

If the target process has finished in S160, the GUI output process proceeds to S170B. In S170B, the content and/or tone can be the same or different from that of S170A.

With this configuration, the voice message or GUI displayed on the display unit 16 of S100B, and the voice message or GUI displayed on the display unit 16 of S170C can be changed from each other. Similarly, the voice message or GUI displayed on the display unit 16 of S170A, and the voice message or GUI displayed on the display unit 16 of S170B can be changed from each other.

While the invention has been described in detail with reference to the specific embodiment thereof, it would be apparent to those skilled in the art that many modifications and variations may be made therein without departing from the scope and spirit of the invention, the scope of which is defined by the attached claims.

For example, the embodiment relates to a printing process or an image-scanning process to be performed in conjunction with the multi-function apparatus 2, as a target process to be displayed in the GUI output process (see FIG. 2). However, the present invention is applicable to various processes as long as progresses can be represented in a bar form. Examples of the various processes include copying, migration, and deletion of file, and install and uninstall of a program.

Further, in the embodiment, the GUI indication displayed in the GUI output process is read aloud by the screen reader as an application program different from the program for executing the GUI output process. However, another application program is also available where the GUI output process is executable and reading aloud the GUI indication is also executable. In this case, in S100, S140, S170 shown in the flowchart of FIG. 2, the application program can not only display the GUI but also output a voice message.

What is claimed is:

1. A non-transitory computer readable storage medium storing a computer-executable program for outputting a user interface to a computer, the computer including a voice message output device for outputting a voice message, and the user interface being configured to consecutively informing the progress of a process executed by the computer and the progress being informed with the voice message through the voice message output device, the program causing the computer to execute the steps comprising:

determining whether or not another user interface consecutively informs the progress of another process with another voice message at the computer upon start timing of informing the progress of a specific process to be executed;

outputting to the computer a first user interface configured to consecutively inform the progress of the specific process with a first voice message that includes a start message indicating a start of the specific process, an ongoing message indicating an ongoing of the specific process, and an end message indicating an end of the specific process, if it is determined that the another user interface does not consecutively inform the progress of the another process with the another voice message; and outputting to the computer a second user interface configured to inform the progress of the specific process with a second voice message that includes the start message and the end message and does not include the ongoing message, if it is determined that the another user interface consecutively informs the progress of the another process with the another voice message.

2. The non-transitory computer readable storage medium storing the computer-executable program according to claim 1, wherein the computer includes an operation device for inputting an instruction to start informing of the progress of a process, the program further comprising:

determining whether or not the informing of the progress of a process has already been started by an instruction inputted through the operation device; and wherein in the first user interface outputting step, the first user interface is outputted, if it is determined that the another user interface does not consecutively inform the progress of the another process with the another voice message, and if it is determined that the informing of the progress of the specific process has already been started by an instruction inputted through the operational device; and wherein in the second user interface outputting step, the second user interface is outputted, if it is determined that the another user interface consecutively informs the progress of the another process with the another voice message, or if it is determined that the informing of the progress of the specific process has not already been started by the instruction inputted through the operational device.

3. The non-transitory computer readable storage medium storing the computer-executable program according to claim 1, wherein the user interface is a graphic user interface; and wherein the computer includes a display unit that displays the graphic user interface indicative of the progress of the process as consecutive display information, the display information displayed on the display unit being read aloud through the voice message output device by a reader program installed in the computer; and wherein in the first user interface outputting step, a first display information that includes a start information indicating a start of the specific process, an ongoing information indicating an ongoing of the specific process, and an end information indicating an end of the specific process is consecutively displayed on the display unit, and the first display information is consecutively read aloud by the reader program; and wherein in the second user interface outputting step, a second display information that includes the start information and the end information and does not include the ongoing information is consecutively displayed on the display unit, and the second display information is consecutively read aloud by the reader program.

4. A non-transitory computer readable storage medium storing a computer-executable program for outputting a user interface to a computer, the computer including a voice message output device for outputting a voice message, and an operation device for inputting instruction to start informing of a progress of a process, the user interface being configured to consecutively inform the progress of the process executed by the computer and the progress being informed with the voice message through the voice message output device, the program causing the computer to execute the steps comprising:

determining whether or not the informing of a progress of a process has already been started by an instruction inputted through the operation device;

outputting to the computer a first user interface configured to consecutively inform the progress of the specific process with a first voice message that includes a start message indicating a start of the specific process, an ongoing message indicating an ongoing of the specific process, and an end message indicating an end of the specific process, if it is determined that the informing of the progress of the specific process has already been started by the instruction inputted through the operation device; and outputting to the computer a second user interface configured to inform the progress of the specific process with a second voice message that includes the start message and the end message and does not include the ongoing message, if it is determined that the informing of the progress of the specific process having been started is not caused by the instruction inputted through the operation device.

5. The non-transitory computer readable storage medium storing the computer-executable program according to claim 4, wherein the user interface is a graphic user interface; and wherein the computer includes a display unit that displays the graphic user interface indicative of the progress of the process as consecutive display information, the display information displayed on the display unit being read aloud by a reader program installed in the computer; and wherein in the step of outputting a first user interface, a first display information that includes a start information indicating a start of the specific process, an ongoing information indicating an ongoing of the specific process, and an end information indicating an end of the specific process is consecutively displayed on the display unit, and the first display information is consecutively read aloud by the reader program; and wherein in the step of outputting a second user interface, a second display information that includes the start information and the end information and does not include the ongoing information is consecutively displayed on the display unit, and the second display information is consecutively read aloud by the reader program.

6. A computer comprising:

data processor for storing a computer-executable program for outputting a user interface to a display, the computer including the voice message output device for outputting a voice message, and the user interface being configured to consecutively inform the progress of a process executed by the data processor and the progress being informed with the voice message through the voice message output device, the program causing the computer to execute the steps comprising:

determining whether or not another user interface consecutively informs the progress of another process with another voice message upon start timing of informing the progress of a specific process to be executed;

outputting a first user interface configured to consecutively inform the progress of the specific process with a first voice message that includes a start message indicating a start of the specific process, an ongoing message indicating an ongoing of the specific process, and an end message indicating an end of the specific process, if it is determined that the another user interface does not consecutively inform the progress of the another process with the another voice message; and outputting a second user interface configured to inform the progress of the specific process with a second voice message that includes the start message and the end message and does not include the ongoing message, if it is determined that the another user interface consecutively informs the progress of the another process with the another voice message.

7. The computer according to claim 6, wherein the data processor further comprises an operation device that inputs an instruction to start informing of the progress of the process, the program causing the computer to execute the further steps of:

determining whether or not the informing of the progress of the process has already been started by the instruction inputted through the operation device;

wherein in the first user interface outputting step, the first user interface is outputted, if it is determined that the another user interface does not consecutively inform the progress of the another process with the voice message, and if it is determined that the informing of the progress of the specific process has already been started by an instruction inputted through the operation device; and wherein in the second user interface outputting step, the second user interface is outputted, if it is determined that the another user interface consecutively informs the progress of the another process with the another voice message, or if it is determined that the informing of the progress of the specific process has not already been started by the instruction inputted through the operation device.

8. The computer according to claim 6, wherein the user interface is a graphic user interface; and the data processor further comprising a display unit that displays the graphic user interface indicative of the progress of the process as consecutive display information, the display information displayed on the display unit being read aloud through the voice message output device by a reader; and wherein in the first user interface outputting step, a first display information that includes a start information indicating a start of the specific process, an ongoing information indicating an ongoing of the specific process, and an end information indicating an end of the specific process is consecutively displayed on the display unit, and the first display information is consecutively read aloud by the reader; and wherein in the second user interface outputting step, a second display information that includes the start information and the end information and does not include the ongoing information is consecutively displayed on the display unit, and the second display information is consecutively read aloud by the reader program.

9. A computer comprising:

a data processor for storing a computer-executable program for outputting a user interface to a computer, the computer including a voice message output device for outputting a voice message, and an operation device for inputting instruction to start informing of a progress of a process, the user interface being configured to consecutively inform the progress of the process executed by the computer and the progress being informed with the voice message through the voice message output device, the program causing the computer to execute the steps comprising:

a determining whether or not the informing of a progress of a process has already been started by an instruction inputted through the operation device;

outputting a first user interface configured to consecutively inform the progress of the specific process with the a first voice message that includes a start message indicating a start of the specific process, an ongoing message indicating an ongoing of the specific process, and an end message indicating an end of the specific process, if it is determined that the informing of the progress of the specific process has already been started by the instruction inputted through the operation device; and outputting a second user interface configured to inform the progress of the specific process with a second voice message that includes the start message and the end message and does not include the ongoing message, if it is determined that the informing of the progress of the specific process having been started is not caused by the instruction inputted through the operational device.

10. The computer according to claim 9, wherein the user interface is a graphic user interface; and the data processor further comprising a display unit that displays the graphic user interface indicative of the progress of the process as consecutive display information, the display information displayed on the display unit being read aloud by a reader; and wherein in the first user interface outputting step, a first display information that includes a start information indicating a start of the specific process, an ongoing information indicating an ongoing of the specific process, and an end information indicating an end of the specific process is consecutively displayed on the display unit, and the first display information is consecutively read aloud by the reader; and wherein in the second user interface outputting step, a second display information that includes the start information and the end information and does not include the ongoing information is consecutively displayed on the display unit, and the second display information is consecutively read aloud by the reader program.

* * * * *